United States Patent
Chow et al.

(10) Patent No.: US 9,538,266 B2
(45) Date of Patent: Jan. 3, 2017

(54) CIRCUIT AND METHOD FOR OPTICAL BIT INTERLEAVING IN A PASSIVE OPTICAL NETWORK USING MULTI-LEVEL SIGNALS

(71) Applicant: Alcatel-Lucent USA Inc., Murray Hill, NJ (US)

(72) Inventors: Hungkei Chow, Murray Hill, NJ (US); Vincent E. Houtsma, Murray Hill, NJ (US); Doutje T. van Veen, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/642,165

(22) Filed: Mar. 9, 2015

(65) Prior Publication Data
US 2016/0269810 A1 Sep. 15, 2016

(51) Int. Cl.
  *H04B 10/54* (2013.01)
  *H04Q 11/00* (2006.01)
  *H04L 7/00* (2006.01)

(52) U.S. Cl.
  CPC ........ *H04Q 11/0067* (2013.01); *H04B 10/541* (2013.01); *H04L 7/0075* (2013.01); *H04L 7/0087* (2013.01); *H04Q 11/0071* (2013.01)

(58) Field of Classification Search
  CPC .... H04B 10/541; H04L 7/0075; H04L 7/0087; H04Q 11/0067; H04Q 11/0071
  USPC .......................................................... 398/45
  See application file for complete search history.

(56) References Cited

U.S. PATENT DOCUMENTS

| | | | |
|---|---|---|---|
| 2004/0057539 A1* | 3/2004 | Boles | H04J 3/0682 375/354 |
| 2009/0103721 A1* | 4/2009 | Sada | H04K 1/02 380/42 |
| 2010/0215371 A1* | 8/2010 | Djordevia | H03M 13/31 398/79 |
| 2013/0216221 A1 | 8/2013 | Zhang et al. | |

(Continued)

FOREIGN PATENT DOCUMENTS

EP    2830239 A1    1/2012

OTHER PUBLICATIONS

Van Praet, Christophe, et al., "Demostration of Low-Power Bit-Interleaving TDM PON," Dec. 10, 2012, vol. 20, No. 26, Optics Express B7, 8 pages.

(Continued)

*Primary Examiner* — Dalzid Singh
(74) *Attorney, Agent, or Firm* — Parker Justiss, PC

(57) ABSTRACT

An optical line terminal transmitter front-end, an optical network terminal receiver front-end and a bit-interleaved passive optical network (BIPON). In one embodiment, the transmitter front-end includes: (1) a bit interleaver configured to group and interleave a plurality of user bit-streams to yield a combined single bit-stream, (2) an encoder coupled to the bit interleaver and configured to encode multiple bits of the single bit-stream into a multi-level code corresponding to a $2^m$-level multi-level signal and (3) a multi-level modulator coupled to the encoder and configured to modulate the multi-level code into the $2^m$-level multi-level signal.

19 Claims, 3 Drawing Sheets

(56) References Cited

U.S. PATENT DOCUMENTS

2014/0068385 A1\* 3/2014 Zhang .................. H03M 13/29
714/776
2014/0281832 A1 9/2014 Zhang et al.
2014/0301734 A1\* 10/2014 Fang ..................... H04J 14/005
398/76

OTHER PUBLICATIONS

ITU-T Telecommunication Standardization Sector of ITU, G.984.7, "Series G: Transmission Systems and Media, Digital Systems and Networks Digital Sections and Digital Line System—Optical Line Systems for Local and access Networks, Gigabit-Capable Passive Optical Networks (GPON): Long reach," Jul. 29, 2010, 11 pages.
Praet, C. V., et al., "10 Gbit/s Bit Interleaving CDR for Low-Power PON," Electronics Letters, vol. 48, No. 21, Oct. 11, 2012, 2 pages.
Chow, H., et al., "Demonstration of Low-Power Bit-Interleaving TDM PON," ECOC Technical Digest, Jan. 1, 2012, 3 pages.
IEEE 802.3 Industry Connections Feasibility Assessment for the Next Generation of EPON Draft 2.0, IEEE 802.3 Ethernet Working Group Communication, Feb. 10, 2015, 101 pages.

\* cited by examiner

CIRCUIT AND METHOD FOR OPTICAL BIT INTERLEAVING IN A PASSIVE OPTICAL NETWORK USING MULTI-LEVEL SIGNALS

TECHNICAL FIELD

This application is directed, in general, to a passive optical network (PON) and, more specifically, to a circuit and method for increasing the aggregated data rate (i.e. transmission speed) of a PON.

BACKGROUND

Optical telecommunication networks have been widely built out in recent years and are gaining in popularity. Optical fibers are capable of carrying a high volume of traffic at a reasonable cost. Although previously the "last mile" between an optical communication network and the end user was still spanned with copper wire, now fiber optic cables are often run directly up to houses, apartment complexes, and business locations. One arrangement for spanning this portion of the communication link is referred to as a PON.

Generally speaking, a PON includes an optical line termination (OLT), typically located in a central office, which communicates via a fiber-optic cable system with one or more optical network units (ONUs), with each ONU being located on or near a customer premises. An optical network termination (ONT) is an ONU that typically serves a single user and may, for example, be located at the user's residence. A multi-dwelling unit (MDU) is an ONU that serves a multi-dwelling unit such as an apartment complex or small business. Each ONU is capable of segregating the downstream signals from the OLT and directing them to the proper user, and of transmitting upstream signals back to the OLT. In addition to forming a part of one or more PONS, the OLT is also connected to the larger telecommunication system through which the various services such as telephony, Internet access, and broadcast media are accessible so that they can be made available to the users associated with the OLT.

Standards have been promulgated for PON operations. For example, many current implementations are configured in accordance with a family of specifications including ITU-T G.984 and related standards. Such systems currently provide for transmission speeds of up to (approximately) 2.5 Gbps in the downstream direction and 1.24 Gbps upstream. The directional difference in transmission speeds is due in part to practical consideration of the cost of facilitating higher upstream transmission speeds, coupled with the fact that, as a general rule, more content needs to be transmitted downstream than back to the OLT.

With increased utilization of optical network services, however, a need exists to increase existing aggregated date rate, at least in the downstream direction and eventually in both directions. One solution, of course, is simply to replace or upgrade all PONs and related equipment with the components necessary to accommodate the higher aggregated date rate. This, however, may be too expensive or difficult, especially in the near term.

For example, the best existing solution in supporting a higher aggregated date rate is a tunable wavelength division multiplexing (TWDM) PON, e.g., ITU-T NGPON2. Unfortunately, this solution requires a WDM filter at the OLT and/or array waveguide gratings (AWGs) in the optical distribution network (ODN) and tunable lasers in the ONT. Apart from the high component cost of each AWG, the WDM filter and the tunable laser, replacing conventional optical power splitters with AWGs in the ODN is costly.

SUMMARY

One aspect provides an optical line terminal transmitter front-end. In one embodiment, the transmitter front-end includes: (1) a bit interleaver configured to group and interleave a plurality of user bit-streams to yield a combined single bit-stream, (2) an encoder coupled to the bit interleaver and configured to encode multiple bits of the single bit-stream into a multi-level code corresponding to a $2^m$-level multi-level signal and (3) a multi-level modulator coupled to the encoder and configured to modulate the multi-level code into the $2^m$-level multi-level signal.

Another aspect provides an optical network terminal receiver front-end. In one embodiment, the receiver front-end includes: (1) a clock-and-data recovery circuit/demultiplexer configured to receive bit-interleaved $2^m$-level multi-level signals and recover a clock signal and multi-level codes therefrom, the multi-level codes being part of a data packet having a header and a payload, (2) a multi-level bit detector coupled to the clock-and-data recovery circuit/demultiplexer and configured to detect bits from the multi-level codes in the header and (3) a bit-interleaved passive optical network header processor coupled to the multi-level bit detector and configured to determine, based on the bits, a subsampling rate, phase and bit position for the clock-and-data recovery circuit/demultiplexer to select for recovery ones of the multi-level codes in the payload.

Yet another aspect provides a bit-interleaved passive optical network (BIPON). In one embodiment, the BIPON includes: (1) an optical line terminal transmitter front-end configured to group and interleave a plurality of user bit-streams to yield a combined single bit-stream, encode multiple bits of the single bit-stream into a multi-level code corresponding to a $2^m$-level multi-level signal and modulate the multi-level code into the $2^m$-level multi-level signal, (2) an optical transmission medium and (3) a plurality of optical network terminal receiver front-ends, each of the optical network terminal receiver front-ends configured to receive the $2^m$-level multi-level signals and recover a clock signal and multi-level codes therefrom, the multi-level codes being part of a data packet having a header and a payload, detect bits from the multi-level codes in the header and determine, based on the bits, a subsampling rate, phase and bit position for the clock-and-data recovery circuit/demultiplexer to select for recovery ones of the multi-level codes in the payload.

BRIEF DESCRIPTION

Reference is now made to the following descriptions taken in conjunction with the accompanying drawings, in which.

DETAILED DESCRIPTION

As stated above, TWDM may be employed to increase aggregated data rate, but it employs relatively expensive parts, and upgrading an existing PON to accommodate TWDM is expensive. A need therefore exists for a way to facilitate an increase in aggregated date rate without having to replace or upgrade components in the OLT and ONUs of a PON. A further need exists for a way to facilitate an increase in aggregated data rate in the context of a BIPON. As those skilled in the pertinent art are aware, a BIPON is a PON in which a bit-interleaving protocol is employed. The bit-interleaving protocol allows the ONUs to avoid wasting power decoding data that is not directed to them. Those skilled in the pertinent art are familiar with BIPONs. One source of information on BIPONs is Van Praet, et al., "Demonstration of Low-Power Bit-Interleaving TDM PON" J. Optics Express, 10 Dec. 2012/Vol. 20, No. 26, p. B7, incorporated herein by reference.

Those skilled in the pertinent art are aware of multi-level modulation, wherein data is conveyed using more than two significant conditions, e.g., defined voltage levels. Introduced herein is multi-level modulation, (MLS), which helps reduce the required signaling rate, making it an attractive candidate for a next generation, higher rate PON. To date, multi-level modulation has not been employed in conjunction with bit interleaving, because the conventional bit-interleaving protocol has never been adapted to accommodate multi-level modulation. Such adaptation requires a substantial modification to the conventional bit-interleaving protocol. In MLS, groups of user data are bit-interleaved and modulated using multi-level technique, so that at each ONT, only part of the multi-level signal in a specific group is needed to be decoded and processed, significantly reducing receiver complexity.

MLS facilitates higher transmissions speed in a PON. MLS is compatible with a PON operating according to a current standard, e.g., ITU-T G.984 and related specifications, as well as those operating according to a standard yet to be implemented or defined.

Figure 1:
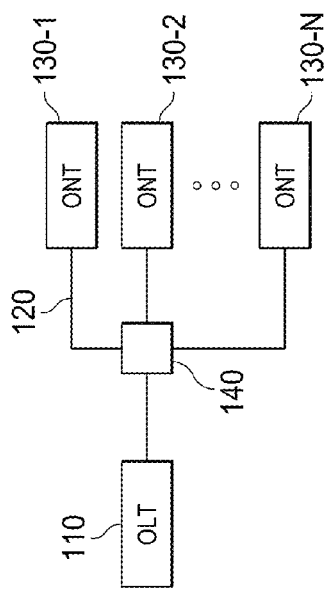
FIG. 1 is a high-level block diagram of one embodiment of one portion of a BIPON.

FIG. 1 is a high-level block diagram illustrating one embodiment of one portion of an example BIPON. In this embodiment, the BIPON employs an OLT 110 to transmit packets of data encoded according to MLS via an optical transmission medium 120, such as an optical fiber, to a plurality of ONTs 130-1, 130-2, ..., 130-N, which are each configured to receive the packets. To facilitate the delivery of the MLS-encoded packets to more than one ONT 130-1, 130-2, ..., 130-N, a passive optical splitter 140 is coupled to the optical medium 120 between the OLT 110 and the ONTs 130-1, 130-2, ..., 130-N, thereby distributing the optical signal from the transmitting OLT 110 to the plurality of ONTs 130-1, 130-2, ..., 130-N.

Figure 2:
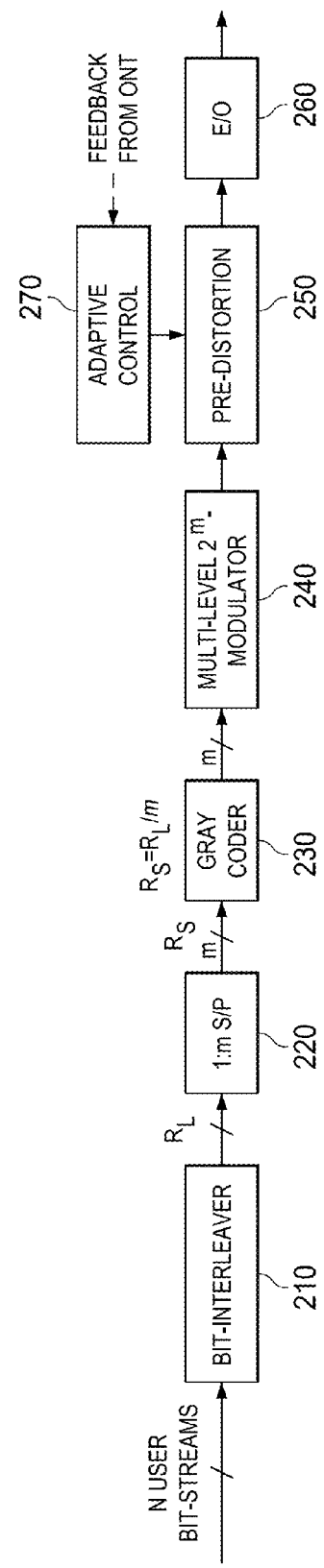
FIG. 2 is a block diagram of one embodiment of an OLT transmitter front-end.

FIG. 2 is a block diagram illustrating one embodiment of an OLT transmitter front-end. At the transmitter, a number of user bit-streams, N, are grouped and interleaved by a bit interleaver 210 into a single bit-stream at rate RL according to a bandwidth allocation. The combined single bit-stream is converted into a m-bit parallel data at rate RS using a 1:m serial-to-parallel converter 220. The m-bit parallel data is then encoded using a coder 230. In one embodiment, the coder 230 is a balanced Gray coder. Next, the coded m-bit parallel data is modulated into a 2m-level multi-level signal by a multi-level $2^m$ modulator 240. Predistortion 250 is then introduced into the 2m-level multi-level signal according to an estimated channel response which is generated by an adaptive control 270 based on feedback from at least one of the ONTs 130-1, 130-2, ..., 130-N of FIG. 1. In one embodiment, the feedback contains signal-to-noise ratios for each bit position at the ONTs 130-1, 130-2, ..., 130-N of FIG. 1. The multi-level signal is finally converted into an optical signal by an electrical-to-optical (E/O) modulator 260.

Figure 3:
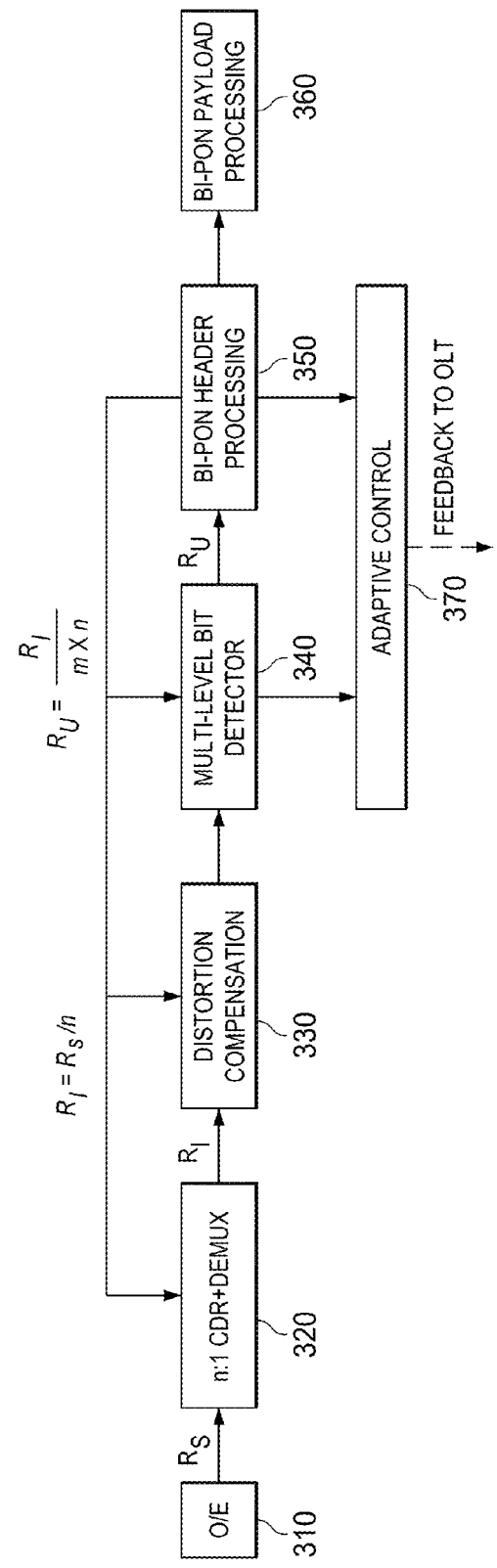
FIG. 3 is a block diagram of one embodiment of an ONT receiver front-end.

FIG. 3 is a block diagram illustrating one embodiment of an ONT receiver front-end. As illustrated in FIG. 3, an optical-to-electrical (O/E) modulator 310 converts an optical signal into a multi-level signal. The ONT receiver front-end then recovers the clock and data at a subsampling rate using a n:1-CDR/demultiplexer 320. The sampling rate, phase and bit position is determined by a BIPON header processor 350. The recovered multi-level signal at rate RI is enhanced using a distortion/dispersion compensation (EDC) module 330 before feeding to a multi-level bit-detector 340. The EDC module is adapted to enhance the multi-level signal according to the channel condition and a current "bit-of-interest" indicated by the BIPON header processor 350 and a BIPON payload processor 360. In one embodiment, an adaptive control 370 provides feedback allowing predistortion to be carried out. In one embodiment, the feedback allows channel response to be estimated.

The multi-level bit-detector finally recovers the information bit at rate RU using a bank of M parallel voltage threshold detectors, where M<<2m, where m is the modulation depth. The number of required threshold detectors depends on the modulation depth m of the multi-level signal. In one embodiment, M is the smallest integer greater than or equal to $2^m/m$. E.g., for m=2, only two voltage threshold detectors are needed, instead of $2^2=4$ threshold detectors. For m=3, only three voltage threshold detectors are needed, instead of $2^3=8$ threshold detectors. At least one combinatorial logic gate is employed to combine the outputs of the voltage threshold detectors. For example, for m=3, a logic AND gate is needed.

Figure 4:
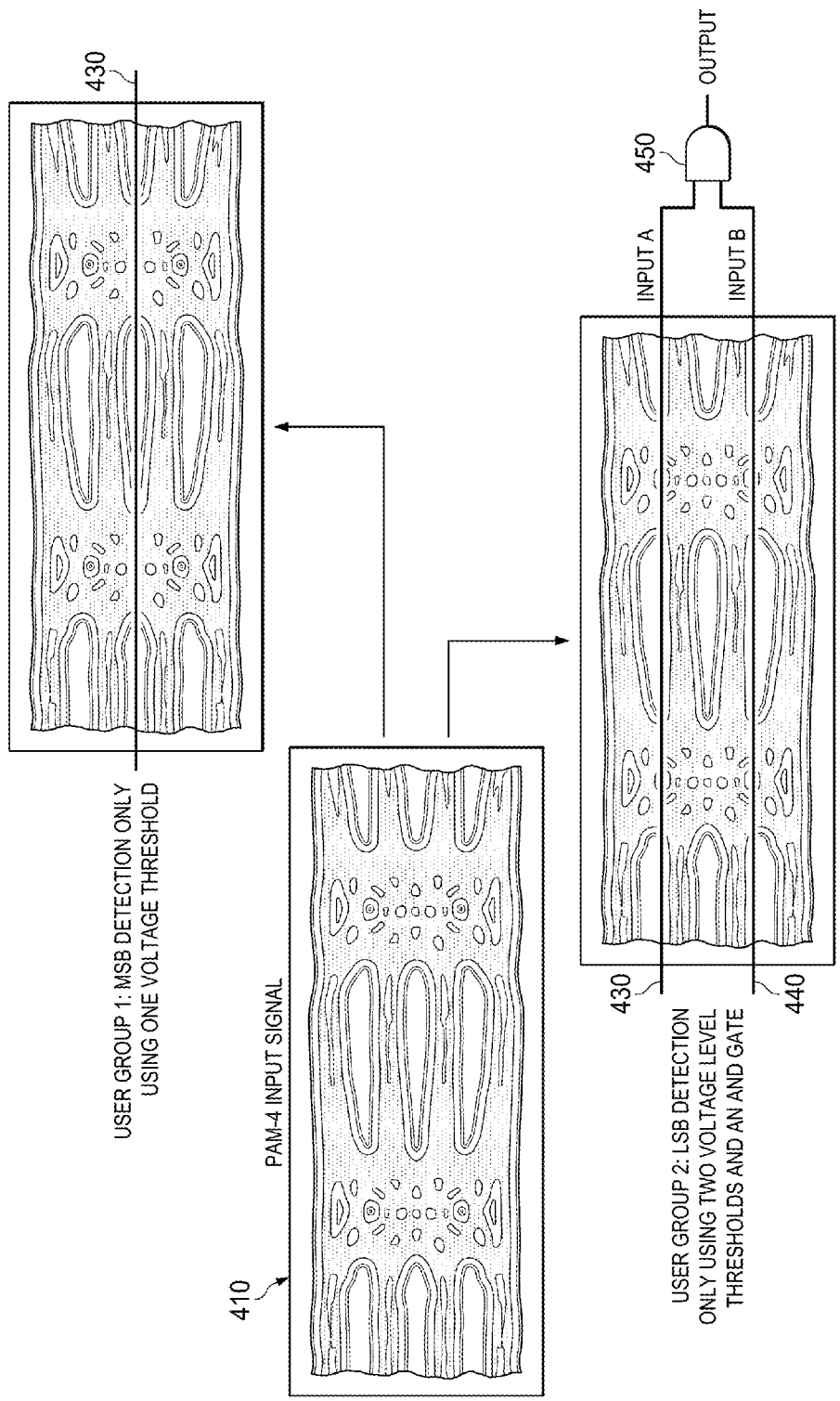
FIG. 4 illustrates example waveforms pertaining to transmission of PAM-4-encoded data in a BIPON.

One embodiment employs pulse-amplitude modulation (PAM), which may be a four-level PAM (4-PAM or PAM-4). FIG. 4 illustrates example waveforms pertaining to transmission of PAM-4-encoded data in a BIPON. As those skilled in the pertinent art understand, PAM is a form of signal modulation where the message information is encoded by using different voltage amplitudes. For instance, PAM-4 has four different amplitude voltages 410: usually 1, 0.5, −0.5, and −1. These four levels are digitally encoded as two bits: a most significant bit (MSB) and least significant bit (LSB). Therefore, the bit rate increases by a factor of two compared to NRZ modulation at the same symbol rate. Because the information is transmitted in four different voltage levels, the four levels should be detected at the receiver.

However, the plurality of ONTs 130-1, 130-2, ..., 130-N may be divided into groups, and each group may be assigned a unique MSB, such that upon detecting the MSB, one of the two groups need not perform any further detection (as the data does not pertain to them), while the other of the two groups can continue to perform further detection. This process can continue, such that further detection relieves further subgroups of ONTs 130-1, 130-2, ..., 130-N from having to perform still further detection.

FIG. 4 illustrates this process. From an input waveform 410, a first voltage threshold 430 is suitable for detecting the MSB. Two additional voltage thresholds 430, 440 are then suitable for detecting the LSB. The output of the two additional voltage detectors may be provided to an AND logic gate 450 to yield the LSB.

In one embodiment, One three different threshold voltage detectors are employed to discriminate among the four levels. In an alternative embodiment, two voltage detectors are used to discriminate among the four levels, wherein at least one of the two voltage detectors has a programmable voltage threshold. Programming threshold voltages allows the same voltage detector to be used in multiple iterations of voltage detection.

Those skilled in the art to which this application relates will appreciate that other and further additions, deletions, substitutions and modifications may be made to the described embodiments.

What is claimed is:

1. An optical line terminal transmitter front-end, comprising:
   a bit interleaver configured to group and interleave a plurality of user bit-streams to yield a combined single bit-stream;
   a 1:m serial-to-parallel converter coupled to said bit interleaver and configured to convert said single bit-stream into a parallel data stream of m width;
   an encoder coupled to said 1:m serial-to-parallel converter and configured to encode multiple bits of said parallel data stream into a multi-level code corresponding to a $2^m$-level multi-level signal; and
   a multi-level modulator coupled to said encoder and configured to modulate said multi-level code into said $2^m$-level multi-level signal.

2. The transmitter front-end as recited in claim 1 wherein said encoder is a balanced Gray coder.

3. The transmitter front-end as recited in claim 1 further comprising an adaptive control configured to introduce predistortion into said $2^m$-level multi-level signal.

4. The transmitter front-end as recited in claim 3 wherein said adaptive control is further configured to receive feedback from at least one optical network terminal and base said predistortion thereupon.

5. The transmitter front-end as recited in claim 1 wherein said bit interleaver is configured to group and interleave said plurality of user bit-streams according to a predetermined rate according to a bandwidth allocation.

6. The transmitter front-end as recited in claim 1 further comprising an electrical-to-optical modulator coupled to said multi-level modulator.

7. The transmitter front-end as recited in claim 1 wherein said $2^m$-level multi-level signals are pulse-amplitude modulation signals.

8. An optical network terminal receiver front-end, comprising:
   a clock-and-data recovery circuit/demultiplexer configured to receive bit-interleaved $2^m$-level multi-level signals and recover a clock signal and multi-level codes therefrom, said multi-level codes being part of a data packet having a header and a payload;
   a multi-level bit detector coupled to said clock-and-data recovery circuit/demultiplexer and configured to detect bits from said multi-level codes in said header; and
   a bit-interleaved passive optical network header processor coupled to said multi-level bit detector and configured to determine, based on said bits, a subsampling rate, phase and bit position for said clock-and-data recovery circuit/demultiplexer to select for recovery ones of said multi-level codes in said payload.

9. The receiver front-end as recited in claim 8 further comprising a distortion/dispersion compensation (EDC) module coupled between said clock-and-data recovery circuit/demultiplexer and said multi-level bit detector and configured to introduce predistortion into said multi-level codes based on said subsampling rate, phase and bit position.

10. The receiver front-end as recited in claim 8 wherein said bit-interleaved passive optical network header processor is further configured to provide said subsampling rate, phase and bit position to said multi-level bit detector.

11. The receiver front-end as recited in claim 8 wherein said multi-level bit detector comprises M parallel voltage threshold detectors, M being a smallest integer at least equaling $2^m/m$, and at least one combinatorial logic gate.

12. The receiver front-end as recited in claim 8 wherein said $2^m$-level multi-level signals are pulse-amplitude modulation signals.

13. The receiver front-end as recited in claim 8 further comprising an optical-to-electrical modulator coupled to said clock-and-data recovery circuit/demultiplexer.

14. A bit-interleaved passive optical network, comprising:
   an optical line terminal transmitter front-end configured to group and interleave a plurality of user bit-streams to yield a combined single bit-stream, encode multiple bits of said single bit-stream into a multi-level code corresponding to a $2^m$-level multi-level signal and modulate said multi-level code into said $2^m$-level multi-level signal;
   an optical transmission medium; and
   a plurality of optical network terminal receiver front-ends, each of said optical network terminal receiver front-ends configured to receive said $2^m$-level multi-level signals from said optical line terminal transmitter front-end via said optical transmission medium, recover a clock signal and multi-level codes therefrom, said multi-level codes being part of a data packet having a header and a payload, detect bits from said multi-level codes in said header and determine, based on said bits, a subsampling rate, phase and bit position for said clock-and-data recovery circuit/demultiplexer to select for recovery ones of said multi-level codes in said payload.

15. The bit-interleaved passive optical network as recited in claim 14 wherein said optical line terminal transmitter front-end is further configured to introduce predistortion into said $2^m$-level multi-level signal based on feedback from at least one of said plurality of optical network terminal receiver front-ends.

16. The bit-interleaved passive optical network as recited in claim 14 wherein said optical line terminal transmitter front-end is further configured to group and interleave said plurality of user bit-streams according to a predetermined rate according to a bandwidth allocation.

17. The bit-interleaved passive optical network as recited in claim 14 wherein said each of said optical network terminal receiver front-ends is further configured to introduce predistortion into said multi-level codes based on said subsampling rate, phase and bit position.

18. The bit-interleaved passive optical network as recited in claim 14 wherein said optical line terminal transmitter front-end comprises a balanced Gray coder.

19. The bit-interleaved passive optical network as recited in claim 14 wherein said $2^m$-level multi-level signals are pulse-amplitude modulation signals.

* * * * *